Jan. 31, 1961

J. W. STRUTHERS 2,969,989

TRAILER

Filed March 9, 1959

*INVENTOR*
JOHN W. STRUTHERS

BY *John N. Widdowson*

*ATTORNEY*

Jan. 31, 1961  J. W. STRUTHERS  2,969,989
TRAILER
Filed March 9, 1959  2 Sheets-Sheet 2

INVENTOR
JOHN W. STRUTHERS
BY *John H. Widdowson*
ATTORNEY

United States Patent Office 2,969,989
Patented Jan. 31, 1961

2,969,989
TRAILER
John W. Struthers, R.R. 1, Clearwater, Kans.
Filed Mar. 9, 1959, Ser. No. 798,118
2 Claims. (Cl. 280—43.11)

This invention relates to transporting. In a more specific aspect, this invention relates to trailer means for transporting equipment, etc. In still a more specific aspect this invention relates to trailer means for hauling behind a vehicle such as a tractor, truck, automobile, and the like. In yet a more specific aspect, this invention relates to a trailer which has a frame or bed which can be vertically positioned relative to the ground or a floor, for example, a frame or bed which can be positioned flush with the ground or floor for loading, and which can be elevated into a desirable hauling position. Still a more specific aspect of my invention concerns a trailer with a frame or bed which can be positioned as desired vertically through power supplied by motor means for example, a double acting servo-motor operated from a hydraulic fluid system such as is available on a tractor, or which can be transported by a truck, automobile, etc.

Trailers have been long known in the art, including trailers which have beds or frames which can be lowered for loading at ground level or on the floor. And, some of these trailers of the prior art are specifically designed for transporting farm machinery, equipment and the like. The trailers of the prior art all have their disadvantages, being difficult to use and operate, slow in use, and expensive to manufacture, maintain and repair. The new trailer means of my invention, which is especially desirably used to transport farm machinery and equipment of an operating width to make hauling same down a road or highway difficult and undesirable when in operation position, is very easy to use and operate, being designed for utilization of the usual double-acting servo-motor means available with the common agricultural and construction work tractors, such operating off of the hydraulic fluid power system of such tractor means. The new vertically positionable trailer frame or bed means of my invention has found wide and valuable use in transporting agricultural machinery endwise down the usual road or highway, such agricultural machinery as rotary hoes, planters, one-way plows, disc harrows, toothed harrows, and the like. Also, the new trailer of my invention has found ready use in hauling such as elongated tanks, lumber, small buildings, and generally is of great value when the object or material to be transported is too long to haul sideways or in normal position down the road or highway. Particularly my trailer is most convenient when the machinery or equipment to be hauled is wheeled mounted itself so that it can easily be rolled onto the frame or bed of the new trailer of my invention while the frame or bed is positioned on the ground or a floor.

The new trailer of my invention has a frame. Wheels are mounted on the frame and pivotally so, in order that the frame is adjustable vertically relative to these wheels. The trailer has a hitch mounted on the frame. This hitch is preferably operated by motor means connectable thereto, preferably a double acting servo-motor. The wheel means of the trailer has connecting means attached thereto, such connecting means being connectable in operative relation to the motor means which operates the connecting means to position the frame vertically relative to the wheels. In the operation of the new trailer of my invention, means are employed to prevent relative movement between the connecting means and the frame in one direction, so that in operation the trailer frame, etc., can act as backing for the force of the motor means. The new trailer of my invention is constructed and operable to have the frame thereof disposed in a lowered position, for example, on the ground or a floor, and to raise the rear end of the frame with the motor means mounted and connected to the trailer hitch and connecting means which operatively joins the motor means and wheel means, such raising occurring during operation of the motor, and with such mounting and further operation of the motor to engage the trailer hitch in the hitch of a vehicle to be used to tow or haul the trailer, and in addition during the engagement of hitches to raise the front end of the frame, such engaging and raising of the front end of the frame occurring with the means to prevent relative movement preventing movement between the connecting means and frame of the trailer.

It is an object of my invention to provide new transporting means.

It is another object of my invention to provide new trailer means with a vertically positionable bed or frame.

It is still another object of my invention to provide a new trailer which is power operated to vertically position the frame or bed of the trailer, specifically vertically positionable relative to the ground or floor for loading the trailer and in an elevated position for hauling the trailer.

Yet another object of my invention is to provide new trailer means with a vertically positionable bed or frame for hauling agricultural equipment, particularly wheel mounted agricultural equipment which can be rolled onto the bed or frame of the trailer when in lowered position with the frame or bed of the trailer on the ground, such trailer bed or frame being vertically positionable operatively through the operation of power means in turn powered by the hydraulic fluid system of a tractor-type vehicle through the use of a servo-motor.

It is another object of my invention to provide new trailer means for hauling agricultural equipment of an elongated nature down a highway or road endwise, such trailer means being easy to manufacture and use, economic to manufacture, maintain and repair, and reliable in operation.

Other objects and advantages of the new trailer of my invention will become apparent to those skilled in the art upon reading this disclosure.

Drawings accompany and are a part of this disclosure. These drawings depict preferred specific embodiments of new trailer means of my invention, and it is to be understood that such drawings are not to unduly limit the scope of my invention.

Figure 1:
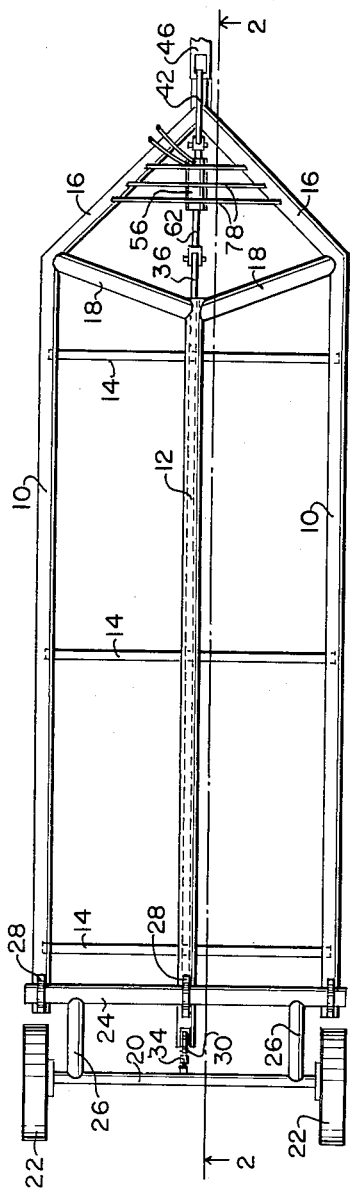
Fig. 1 is a top plan view of a preferred specific embodiment of the new trailer means of my invention.

Following is a discussion and description of the new trailer means of my invention made with reference to the drawings whereon the same reference numerals are used to indicate same or similar parts and/or assemblies. The discussion and description is of preferred specific embodiments of the new trailer means of my invention, and it is to be understood that such discussion and description is not to unduly limit the scope of my invention.

Referring now to the drawings, Figs. 1 through 8, a preferred specific embodiment of the new trailer of my invention is shown. It can be and is preferably made substantially elongated, as shown in Figs. 1 through 4, and has a frame or bed which is elongated, and which has oppositely mounted and spaced side members 10. Down the middle of the frame or bed is a tubular member 12 which runs substantially the length of the side members 10 to the front, and which preferably projects past the rear ends of frame members 10. This tubular member 12 can conveniently be made of pipe, as can side members 10. A plurality of lateral frame members 14 are suitably attached, such as by welding, to the bottoms of longitudinal frame members 10 and 12, and these lateral members 14 can conveniently be cut from standard metal bar stock. In the use of the trailer of my invention, planks or sheets of wood, metal or the like, can be placed on members 14 between side members 10 and central longitudinal member 12 to provide a substantially solid trailer bed, if such is desired. The front end portion of the frame or bed structure of the trailer is preferably made pointed in the manner of the V-shape shown in Fig. 1, and this can be accomplished conveniently by providing frame members 16 of metal pipe joined together and to the front ends of side members 10 in a suitable manner, such as by welding. The front end of the frame structure is preferably braced by lateral members 18 suitably and preferably attached to central tubular member 12 and outer members 10 and 16. This has proven to be a very strong and suitable frame structure for the trailer.

The rear end of the trailer frame or bed is provided with a wheel assembly pivotally joined thereto. This wheel assembly has an axle 20, which is preferably non-rotatable. On the outer ends of axle 20 are mounted a pair of wheels 22. Pneumatic rubber tired wheels have been found preferable in use, usual automobile tires and wheels or truck tires and wheels have been found suitable. A rotatable shaft 24 is rigidly joined to axle 20 by lifting and joining arms 26, and these members can be of any suitable material, lengths of pipe having been found suitable. The shaft 24 is rotatably mounted transverse of the frame or bed of the trailer on the rear end thereof, whereupon the wheel and axle assembly 22 and 20 allows the frame to move vertically in relation thereto. Rotatable shaft 24 can be mounted on the rear end of the frame in any suitable manner, preferably by pillar brackets 28 welded or bolted to the frame members, and if desired, pillar bearings (not shown) can be used along with brackets 28. However, I have found mere bracket mounting suitable, and that it is desirable to extend shaft 24 slightly beyond the outer side of the brackets 28 to provide for slight play which occurs due to the elongation of the frame or bed of the trailer. A sprocket 30 having an axle 32 is mounted in a slot on the top side of central tubular member 12 of the frame, and this sprocket 30 receives chain 34 in trailer operation, as will be set forth hereinafter. As will be apparent to those skilled in the art, sprocket 30 and chain 34 can suitably be a sheave and belt, etc., if desired. The sprocket 30 rotates under the urging of chain 34 during operation to maintain the desired position of connecting rod 36, and to provide for free and easy trailer operation.

A U-shaped trailer hitch having a rear leg portion 38, a forward leg portion 40 and a connecting base portion 42 is pivotally mounted in the V apex of the forward end of the frame or bed of the trailer by a pin 44 suitably attached to frame members 16, such as by welding. This trailer hitch acts in operation to engage leg 40 thereof in the aperture of the trailer hitch 46 of a tractor (not shown), or the like. And, in so engaging, the front end of the trailer frame or bed is elevated into towing or hauling position. The front end of the frame preferably has a forwardly extending arm member 48 with an aperture 50 threrein through which leg 40 projects when the trailer is connected to the tractor (not shown) through trailer hitch 46, and nut means 52 can be mounted on the end of leg 40, if desired, to maintain the desired hitched position (Fig. 1). Stop 54 is suitably mounted between frame members 16 to limit the pivot of the trailer hitch rearwardly, the limit being shown in Figs. 6 and 7 of the drawings.

Powering means are provided to operate the trailer hitch and the trailer, and this powering means can conveniently be a motor, preferably the usual double acting hydraulic cylinder or servo-motor 56 with which most agriculture tractors are equipped for the operation of farm equipment. It is preferred that the new trailer means of my invention be made for easy mounting of the usual double acting servo-motor. However, it can be provided with its own permanently mounted and connected servo-motor 56, if desired. The servo-motor 56 can be mounted in either direction, but I have found it convenient and desirable to mount servo-motor 56 in the manner as shown in detail in Figs. 5-7, that is, with the head end 58 pivotally connected by pin means 60 to the trailer hitch at a point opposite the point of pivotally mounting the trailer hitch by pin means 44. This gives the most leverage in operation. The outer end of piston rod 62 of servo-motor 56 is pivotally connected to the front end of connecting rod 36 which is mounted in central tubular frame member 12. Bracket 64 and pin means 66 can be suitably used to so pivotally join piston rod 62 and connecting rod 36. The hydraulic fluid conduits, 68 to the rear end of servo-motor 56 and 70 to the forward end of servo-motor 56, in operation are connected to the usual four-way valve (not shown) of the tractor (not shown) to supply hydraulic fluid to the servo-motor 56 from the hydraulic fluid system of such tractor.

Connecting rod 36 is preferably provided with an eye 72 on its rear end, such eye engaging the inner end of link chain 34 and connecting it to rod 36. The other end of link chain 34 is secured to axle 20 by a bracket 74 having an eye, or other suitable means can be employed, of course. The forward end portion of connecting rod 36 has an aperture therethrough which receives pin means 76, the pin 76 in operation abutting against the front end of centrally mounted tubular member 12 to limit movement of connecting rod 36 relative to tubular member 12 in rearward direction. The aperture for pin 76 in rod 36 is located just out of the front end of tubular frame member 12 with the rear end of the frame or bed of the trailer in full elevated position, the position of Figs. 1, 2, 3, 5, 6 and 8. With pin 76 in the aperture in connecting rod 36, the rear end of the frame or trailer bed will remain in full elevated position.

The structural refinement of providing guard members 78 over servo-motor 56 between frame members 16 has been found to be a distinct advantage in protecting the servo-motor.

Figure 2:
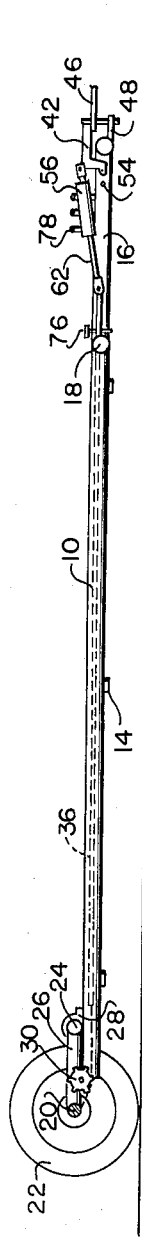
Fig. 2 is a view taken on line 2—2 of Fig. 1, the trailer being in towing or hauling position, hitched to the trailer hitch of a tractor (not shown).
Figure 3:
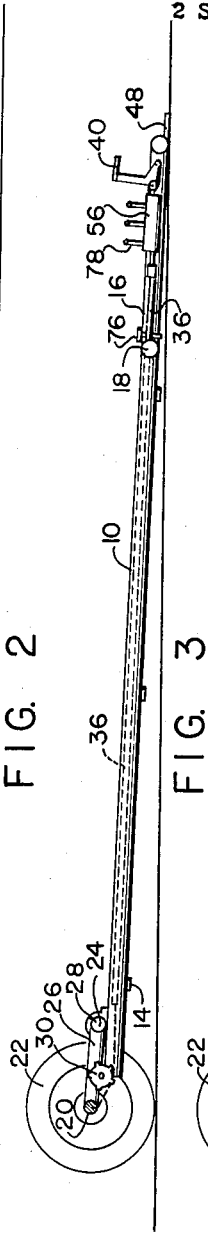
Fig. 3 is a view similar to the longitudinal cross section view of Fig. 2, except with the front end of the trailer in lowered position, the position prior to attaching the trailer to the tractor trailer hitch.
Figure 4:
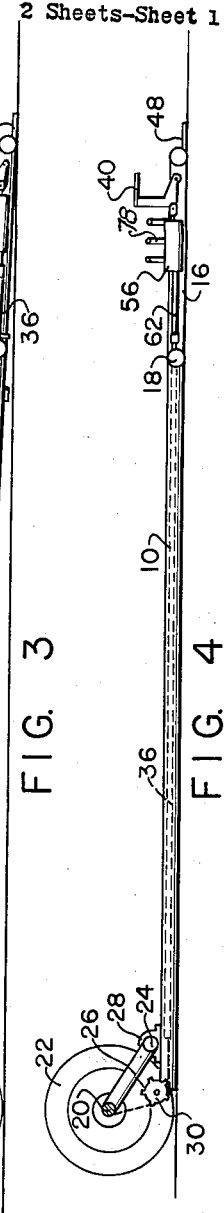
Fig. 4 is a view of the trailer on the same longitudinal cross section view, except with the bed or frame of the trailer in completely lowered position flush with the ground or a floor.
Figure 5:
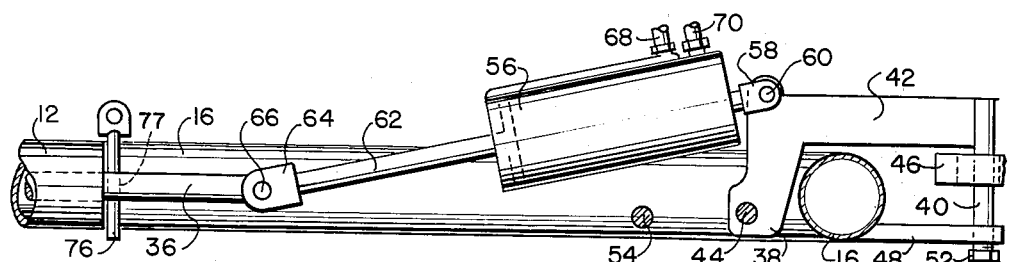
Fig. 5 is an enlarged side elevation view, partly in cross section and partly cut away, showing the power operating means of the trailer and cooperating structure, the position of Fig. 2.
Figure 6:
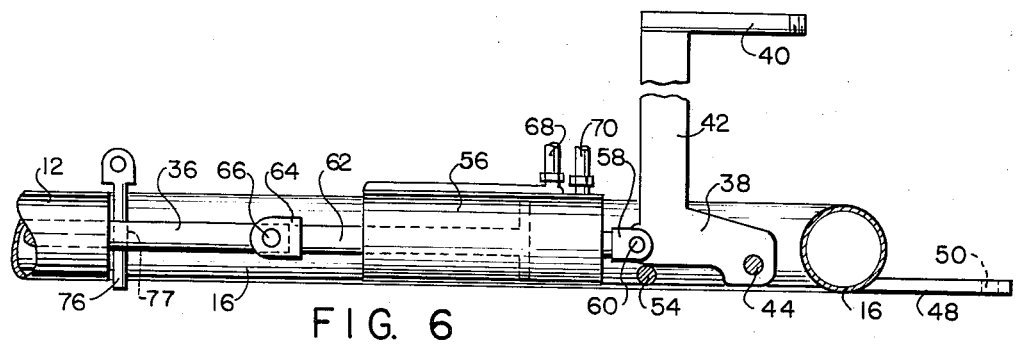
Fig. 6 is an enlarged side elevation, partly in cross section and partly cut away, showing the power means and cooperating assembly in the position of Fig. 3.
Figure 7:
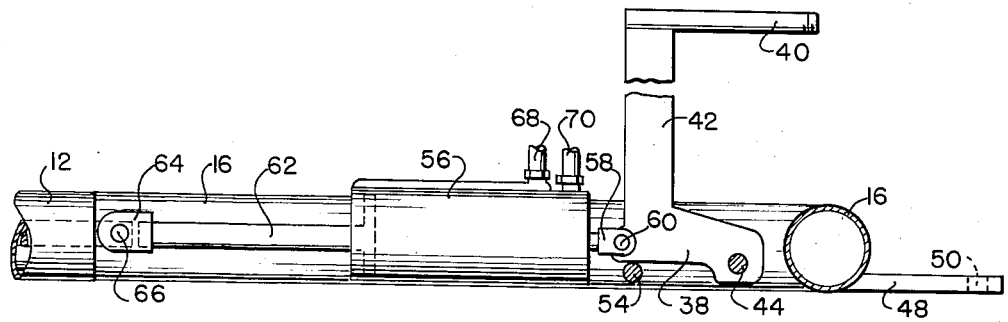
Fig. 7 is the same, but in the position of Fig. 4.
Figure 8:
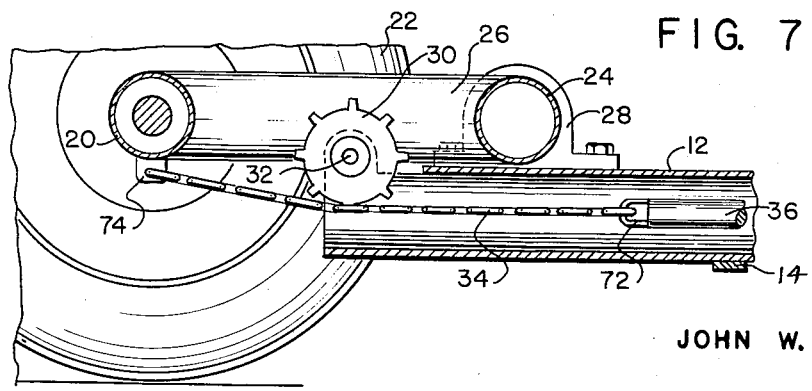
Fig. 8 is an enlarged side elevation view in cross section and partly cut away of the rear end of the trailer of Figs. 1-7, showing the preferred wheel assembly, rear elevation means and sprocket thereof.

The operation of my trailer is as follows: With the pin 76 removed from the aperture in connecting rod 36, and servo-motor 56 in extended position in regard to piston rod 62, the trailer bed or frame will rest flush with the ground which is the loading position (Fig. 4). It should be pointed out that the particular frame structure of my trailer shown in the drawings is preferred from a loading standpoint, because the frame members are somewhat free to move up and down in the rear end portion to accommodate rough terrain in loading. The wheel mounted farm equipment, for example, a rotary hoe, drill, and the like, with which my trailer has proven particularly advantageous, is rolled onto the trailer frame or bed laterally. If desired, the wheels of the agricultural equipment can be chained or clamped to the trailer frame members. Substantial support is obtained as a result of the wheels of the farm equipment resting between one of the side frame members 10 and the longitudinal central member 12. The size of the agricultural equipment wheels govern the desired spacing between the longitudinal frame members of the trailer bed or frame. To place the trailer in hauling or towing position, the servomotor 56 is operated to retract piston rod 62, whereupon connecting rod 36 and chain 34 work to pivot the rear end of the trailer frame in relation to arm members 26 and to elevate the rear end of the trailer frame to the position of Fig. 3 of the drawings. Then, pin 76 is inserted in the aperture 77 in connecting rod 36. The towing tractor (not shown) having tractor trailer hitch 46 thereon is moved into position to the front of the trailer, so that upon pivoting the trailer hitch from the position of Figs. 3 and 6 of the drawings, leg 40 of the trailer hitch will pass into the aperture of tractor trailer hitch 46. Leg 40 must be made long enough to provide for this, since tractor trailer hitch 46 will be elevated from the ground or floor level. To pivot the trailer hitch, servo-motor 56 is operated to extend piston rod 62. The body of the motor and head 58 thereof then moves forwardly, the trailer providing the backing for such operation. When piston rod 62 is extended, the trailer hitch will be in the position of Figs. 1, 2 and 5, and the front end of the trailer will be elevated from the ground or floor, as shown in Figs. 2 and 5. If desired, nut 52 can be secured on the end of leg 40 of the trailer hitch, so that servo-motor 56 can be removed during towing or hauling. With nut 52 removed, to lower the trailer frame or bed with servo-motor 56 mounted, the piston rod 62 is retracted, resulting in the front end of the trailer being lowered to ground level or the floor. Then, pin 76 is removed from the aperture in connecting rod 36, and piston rod 62 extended to lower the rear end of the trailer.

As will be evident to those skilled in the art, various modifications of this invention can be made, or followed, in the light of this disclosure and discussion, without departing from the spirit or scope of the disclosure or from the scope of the claims.

I claim:

1. A trailer comprising, an elongated frame having side members and a centrally located tubular member longitudinal thereof, a non-rotatable axle, a pair of wheels mounted on the end portions of said axle, a shaft rotatably mounted by pillar brackets on the top of the rear end portions of said side and centrally located frame members, a pair of spaced arm members rigidly connecting said axle and shaft, said frame being adjustable vertically relative to axle and wheels, a freely rotatable sprocket wheel mounted on the rear end portion of said centrally located frame member, a V-shaped frame portion fixed to the front end portions of said side and centrally located frame members and pointed forwardly, an inverted U-shaped trailer hitch pivotally mounted in the forward end portion of the V of said frame portion in an outer end portion of one of the legs of said hitch, a double acting servo-motor having its head end pivotally connected to the other end portion of said one of the legs of said hitch in operating relation thereto, a connecting rod slidably mounted in said centrally located tubular frame member with one end portion pivotally connected to the piston rod of said servo-motor and having an aperture therethrough, a length of chain with one end portion thereof attached to said axle and the other end portion attached to the other end portion of said connecting rod and engaging said sprocket wheel therebetween, and a pin removably insertable in said aperture to prevent relative movement between said connecting rod and tubular frame member in one direction, and said trailer constructed and operable to (1) have said frame disposed flush with the ground with said pin removed from said connecting rod and with said piston rod of said servo-motor extended and (2) to raise the rear end of said frame from said ground upon retraction of said servo-motor piston rod with said pin removed from said connecting rod, and to (3) engage said trailer hitch in the other leg portion in the aperture of a tractor hitch and to raise the front end of said frame with said pin inserted in said connecting rod upon extension of said servo-motor piston rod.

2. A trailer comprising, an elongated frame having a tubular member longitudinal thereof, a pair of wheels mounted on an axle in turn pivotally mounted on the rear end portion of said frame with said frame adjustable vertically relative to said wheels and axle, a trailer hitch having spaced leg portions and pivotally mounted in the forward end portion of said frame, a double acting servo-motor connectable in one end portion to said hitch in pivoting and operating relation thereto, connecting means having a rigid portion with an aperture therethrough and slidably mounted in said tubular frame member and with one end portion of said connecting means connected to the other end portion of said servo-motor, the other end portion of said connecting means attached to said axle, and pin means removably insertable in said aperture in said rigid portion of said connecting means to prevent relative movement between same and said tubular frame member, and said trailer constructed and operable to be disposed flush with the ground, to raise the rear end of said frame upon retraction of the piston rod of said servo-motor, and to engage one of the legs of said trailer hitch in the aperture of a vehicle hitch and to raise the front end of said frame with said pin means in said aperture in said connecting means upon extension of said servo-motor piston rod.

References Cited in the file of this patent

UNITED STATES PATENTS

| | | |
|---|---|---|
| 2,515,379 | Paine | July 18, 1950 |
| 2,621,942 | Getz | Dec. 16, 1952 |
| 2,745,674 | Struble | May 15, 1956 |
| 2,780,475 | Koerner | Feb. 5, 1957 |
| 2,864,626 | Schantz | Dec. 16, 1958 |